(12) United States Patent
Tatham et al.

(10) Patent No.: US 7,715,955 B2
(45) Date of Patent: May 11, 2010

(54) AIRCRAFT PILOTING SYSTEM, AT LEAST FOR PILOTING THE AIRCRAFT DURING A NON PRECISION APPROACH WITH A VIEW TO A LANDING

(75) Inventors: Gilles Tatham, La Salvetat Saint Gilles (FR); Eric Peyrucain, Saint Genies Bellevue (FR)

(73) Assignee: Airbus France, Toulouse (FR)

( * ) Notice: Subject to any disclaimer, the term of this patent is extended or adjusted under 35 U.S.C. 154(b) by 499 days.

(21) Appl. No.: 10/803,184

(22) Filed: Mar. 18, 2004

(65) Prior Publication Data

US 2004/0199304 A1 Oct. 7, 2004

(30) Foreign Application Priority Data

Mar. 19, 2003 (FR) .................................. 03 03336

(51) Int. Cl.
*B64G 1/36* (2006.01)
(52) U.S. Cl. ..................... 701/16; 701/18; 340/976; 340/972; 244/183
(58) Field of Classification Search .................. 701/16, 701/18; 340/972–979; 73/178 T; 244/183, 244/185, 186
See application file for complete search history.

(56) References Cited

U.S. PATENT DOCUMENTS

| | | | | |
|---|---|---|---|---|
| 4,534,000 A | * | 8/1985 | Bliss | ........................... 701/16 |
| 5,820,080 A | | 10/1998 | Eschenbach | ................ 244/183 |
| 5,931,889 A | * | 8/1999 | Misra | ......................... 701/213 |
| 5,945,943 A | * | 8/1999 | Kalafus et al. | ......... 342/357.08 |
| 6,178,379 B1 | | 1/2001 | Dwyer | ....................... 701/205 |
| 6,239,745 B1 | * | 5/2001 | Stratton | ..................... 342/410 |
| 6,263,263 B1 | * | 7/2001 | Shehi et al. | .................... 701/3 |
| 6,342,853 B1 | * | 1/2002 | Kalafus et al. | ......... 342/357.03 |
| 6,570,531 B1 | * | 5/2003 | Stratton et al. | ......... 342/357.06 |
| 6,711,479 B1 | * | 3/2004 | Staggs | ......................... 701/16 |
| 2002/0099528 A1 | * | 7/2002 | Hett | ............................ 703/13 |
| 2004/0119638 A1 | * | 6/2004 | Fagan et al. | ............ 342/357.03 |

FOREIGN PATENT DOCUMENTS

EP 1273987 1/2003

OTHER PUBLICATIONS

Stratton et al., "Certification and Operational Performance of GPS-Based Landing Systems," Sep. 12, 2001, ION GPS 2001.*
Hang et al., "Trials and Tests—Status of GPS/Loran Prototype for FAA Trial," Oct. 25, 2002, Proceedings of the $31^{st}$ Annual ILA Convention and Technical Symposium.*

* cited by examiner

*Primary Examiner*—Khoi Tran
*Assistant Examiner*—Brian J Broadhead
(74) *Attorney, Agent, or Firm*—Dickinson Wright PLLC

(57) ABSTRACT

An aircraft piloting system may include information sources that provide a position indication relating to the aircraft and information that characterizes a virtual approach axis. An information processing unit processes information emanating from the information sources and includes an assisted approach mode function and a landing aid multimode receiver that implements a precision approach. A user device uses the information provided by the landing aid multimode receiver to support the guidance of the aircraft up to its landing.

15 Claims, 2 Drawing Sheets

AIRCRAFT PILOTING SYSTEM, AT LEAST FOR PILOTING THE AIRCRAFT DURING A NON PRECISION APPROACH WITH A VIEW TO A LANDING

FIELD OF THE INVENTION

The present invention relates to an aircraft piloting system, at least for piloting the aircraft during a non precision approach with a view to a landing.

SUMMARY OF THE INVENTION

Within the framework of the present invention, the expression "non precision approach" is understood to mean an approach which is not an instrument precision approach, such as for example an approach of ILS ("Instrument Landing System") type. It is known that, in order to implement an instrument precision approach, use is made of ground stations that are situated on the strip verge and at least one specialized radio receiver mounted aboard the aircraft, which provides horizontal and vertical guidance before and during landing by presenting the pilot with the lateral deviation with respect to an approach axis and the vertical deviation with respect to a descent plane. Such an instrument precision approach affords considerable and effective assistance with landing (through lateral guidance and vertical guidance) in particular through poor visibility (fog, etc) or in the absence of visibility.

A non precision approach, such as considered in the present invention, therefore exists when the above information is not available, at least in part, so that a standard precision approach cannot be implemented.

The present invention relates to a piloting system making it possible to implement a non precision approach such as this.

For this purpose, according to the invention, said piloting system of the type comprising:
  information sources;
  an information processing unit, which processes information emanating from said information sources; and
  a user device, which uses the results of processings implemented by said information processing unit, is noteworthy in that:
  said information sources provide said information processing unit with at least one indication of position relating to the actual position of the aircraft and information making it possible to characterize a virtual approach axis; and
  said information processing unit comprises a landing aid multimode receiver comprises an assisted approach mode function, which is able to determine the lateral and vertical deviations between the actual position of the aircraft and the position that it would have if it were on said virtual approach axis, and which transmits the lateral and vertical deviations thus determined to said user device.

Such a landing aid multimode receiver, preferably of MMR ("Multi Mode Receiver") type, is intended in a standard manner to implement an instrument precision approach, for example of ILS type, by using the signals transmitted by the aforesaid ground stations.

By virtue of the integration in accordance with the invention of said so-called Flight Management Landing System (FLS) assisted approach mode function (which makes it possible to implement a non precision approach) into said landing aid multimode receiver, it is possible to use links between equipment (computers, sensors) that already exist, as specified hereinbelow, and the implementation of the invention requires only modifications of software type, thereby making it possible of course to reduce the cost and bulk.

Moreover, the solution is very robust and upgradeable, since any updates can be carried out (simply and rapidly) in software fashion.

Advantageously, said landing aid multimode receiver comprises a satellite-based positioning function, linked with a satellite-based positioning system. Furthermore, in a preferred embodiment, said information sources comprise a flight management computer, preferably of FMS ("Flight Management System") type, as well as a plurality of sensors which are connected to said flight management computer.

Additionally, advantageously, said information sources comprise, moreover, an inertial reference unit which determines a first position indication of the aircraft.

In this case, in a first variant, said inertial reference unit provides said first position indication to the flight management computer, which then transmits this first position indication to said landing aid multimode receiver.

Furthermore, in a second variant, said inertial reference unit provides said first position indication directly to said landing aid multimode receiver, by way of a specific link. In this case, advantageously, said landing aid multimode receiver comprises a satellite-based positioning function linked with a satellite-based positioning system, which determines a second position indication, and said landing aid multimode receiver determines on the basis of said first and second position indications a first refined position indication, which is therefore particularly precise.

Additionally, in a particular embodiment, the piloting system in accordance with the invention comprises a satellite-based positioning device which determines a third position indication which it provides to said inertial reference unit, and said inertial reference unit determines a second refined position indication on the basis of said first and third position indications. This makes it possible to obtain a particularly reliable and precise position indication.

In this case, in a first variant, said inertial reference unit provides said second refined position indication to the flight management computer, which then transmits this second refined position indication to said landing aid multimode receiver.

In a second variant, said inertial reference unit provides said second refined position indication directly to said landing aid multimode receiver, by way of a specific link. This makes it possible to improve the level of integrity of the aircraft's position indications and, moreover, to reduce their transmission deadline.

Additionally, in another particular embodiment, the piloting system in accordance with the invention comprises a satellite-based positioning device which determines a fourth position indication which it provides to a flight management computer, said inertial reference unit provides said first position indication likewise to said flight management computer, and said flight management computer determines, on the basis of said first and fourth position indications, a third refined position indication, which it transmits to said landing aid multimode receiver.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
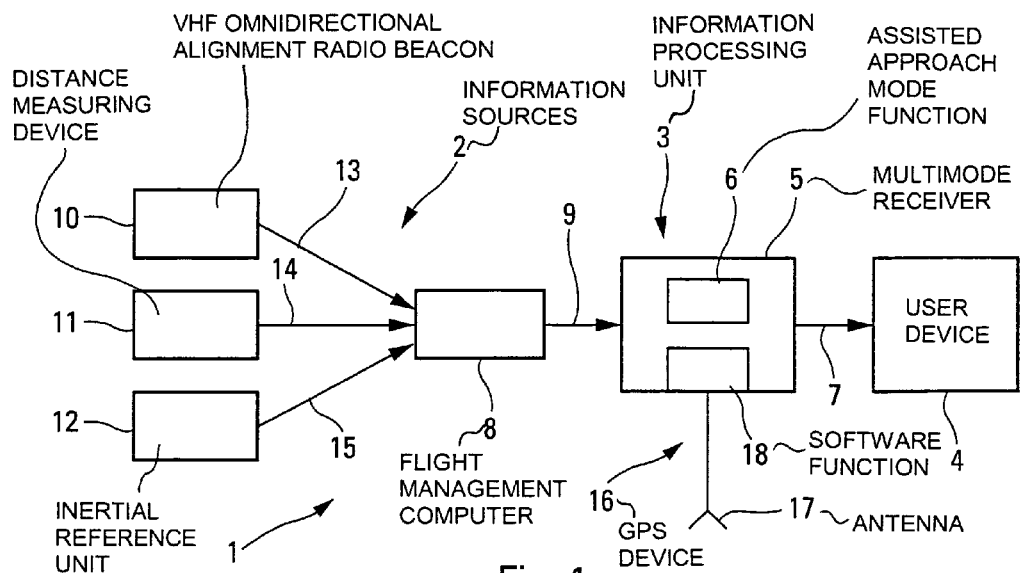
FIG. 1 illustrates a first embodiment of the invention for piloting an aircraft during a non-precision approach.

The system 1 in accordance with the invention and represented in a basic embodiment in FIG. 1, is intended for the piloting of an aircraft, in particular of a civil transport plane, at least for piloting the aircraft during a non precision approach (that is to say in the absence of information making it possible to implement a standard instrument precision approach) with a view to a landing on a landing strip (not represented).

Said piloting system 1 which is carried on board the aircraft, is of the type comprising:
  information sources 2;
  an information processing unit 3, which processes information emanating from said information sources 2; and
  a user device 4, which uses the results of processings implemented by said information processing unit 3.

According to the invention:
  said information sources 2 provide said information processing unit 3:
    with at least one position indication relating to the actual position of the aircraft, which position indication may be determined and transmitted in various ways within the framework of the present invention, as specified hereinbelow; and
    information making it possible to characterize a virtual approach axis, for the approach to the landing strip. Of course, this information, considered in the non precision approach of the present invention, does not comprise the data from guidance ground stations as in the case of an instrument precision approach; and
  said information processing unit 3 comprises a landing aid multimode receiver 5, preferably of MMR ("Multi Mode Receiver") type which comprises a so-called FLS assisted approach mode function 6, relating to a non precision approach and able to determine the lateral and vertical deviations between the actual position of the aircraft and the position that it would have if it were on said virtual approach axis, and which transmits the lateral and vertical deviations thus determined to said user device 4, by way of a link 7.

It is known that during a non precision approach, one of a plurality of possible assisted approach modes may be implemented, the assisted approach mode used being selected by the pilot. According to these assisted approach modes:
  a virtual approach axis is determined, in particular on the basis of information contained in a database carried on board the aircraft and forming part of said information sources 2;
  the lateral and vertical deviations of the position of the aircraft (of which a position indication is received from said information sources 2) with respect to this virtual approach axis, are computed by way of said FLS assisted approach mode function 6, which is integrated according to the invention into said landing aid multimode-receiver 5; and
  the aircraft is then piloted in such a way as to cancel out these deviations.

More precisely, said user device 4 uses the information provided by said landing aid multimode receiver 5 to allow the guidance of the aircraft up to its landing, either directly (the user device 4 can then comprise an automatic pilot), or indirectly (the user device 4 can then comprise a display screen, for presenting said information to the pilot who in this case carries out the guidance).

As may be seen in FIGS. 1 to 4, said information sources 2 comprise a flight management computer 8, preferably of FMS ("Flight Management System") type, which is connected by a link 9 to said landing aid multimode receiver 5, as well as a plurality of sensors 10, 11, 12 which are connected respectively by links 13, 14, 15 to said flight management computer 8 and which comprise in particular:
  a VHF omnidirectional alignment radiobeacon 10, preferably of VOR ("VHF Omnidirectional Range") type. An omnidirectional radiobeacon such as this, with very high frequency and short range, provides on board the aircraft an indication of a bearing of the radiobeacon or the left and right departures from the course;
  a distance measuring device 11, preferably of DME ("Distance Measuring Equipment") type. Such a device measures the round-trip time for signals between the aircraft and a sender/receiver on the ground and deduces therefrom the distance and the ground speed; and
  an inertial reference unit 12, preferably of IRS ("Inertial Reference System") type or of ADIRS ("Air Data and Inertial Reference System") type.

The flight management computer 8 transmits information (position of the threshold of the landing strip, slope or angle of descent, etc) emanating, for example, from a database, to the landing aid multimode receiver 5, which information makes it possible to characterize a virtual approach axis which is representative of the assisted approach mode, selected by the pilot (from among the plurality of assisted approach modes that are possible for a non precision approach).

Additionally, said flight management computer 8 also transmits a position indication of the aircraft to said landing aid multimode receiver 5, which indication makes it possible to define the altitude, the longitude and the latitude of the aircraft.

In the particular embodiment represented in FIG. 1:
  in a first variant, this position indication is computed by the computer 8, on the basis of information received from various systems and sensors 10, 11, 12; and
  in a second variant, this position indication is computed by the inertial reference unit 12, on the basis of its own sensors (pressure sensors for the altitude, inertial platform).

The piloting system 1 in accordance with the invention comprises, moreover, a satellite-based positioning device 16, which is linked with a GPS ("Global Positioning System") type system and which comprises an antenna 17 and a software function 18 which is integrated into the landing aid multimode receiver 5.

By virtue of the integration in accordance with the invention of said so-called FLS assisted approach mode function (which makes it possible to implement a non precision approach) into said landing aid multimode receiver 5, it is possible to use links between equipment (computers, sensors) that already exist, and the implementation of the invention requires only modifications of software type, thereby making it possible of course to reduce the cost and bulk.

Moreover, this solution is very robust and upgradeable, since in general it requires only software updates.

Furthermore, numerous functionalities relating to the use of the parameters emanating from the landing aid multimode receiver 5, which functionalities are for example integrated into the user device 4 and which are developed in respect of instrument approach modes (for example ILS), are reusable when an FLS assisted approach mode (in respect of a non precision approach) is selected. In a non-limiting manner, mention may be made of the automatic pilot guidance laws, as well as the displaying on a display screen of the deviations between the position of the aircraft and the approach axis [in this case however, a different display symbology is preferably used in FLS assisted approach mode (in respect of a non precision approach) to attract the pilot's attention to the activation of this mode]. Thus, the architecture in accordance with the invention of the piloting system 1 facilitates the production of a man/machine interface which is as akin as possible to the standard interface corresponding to an ILS instrument approach.

Figure 2:
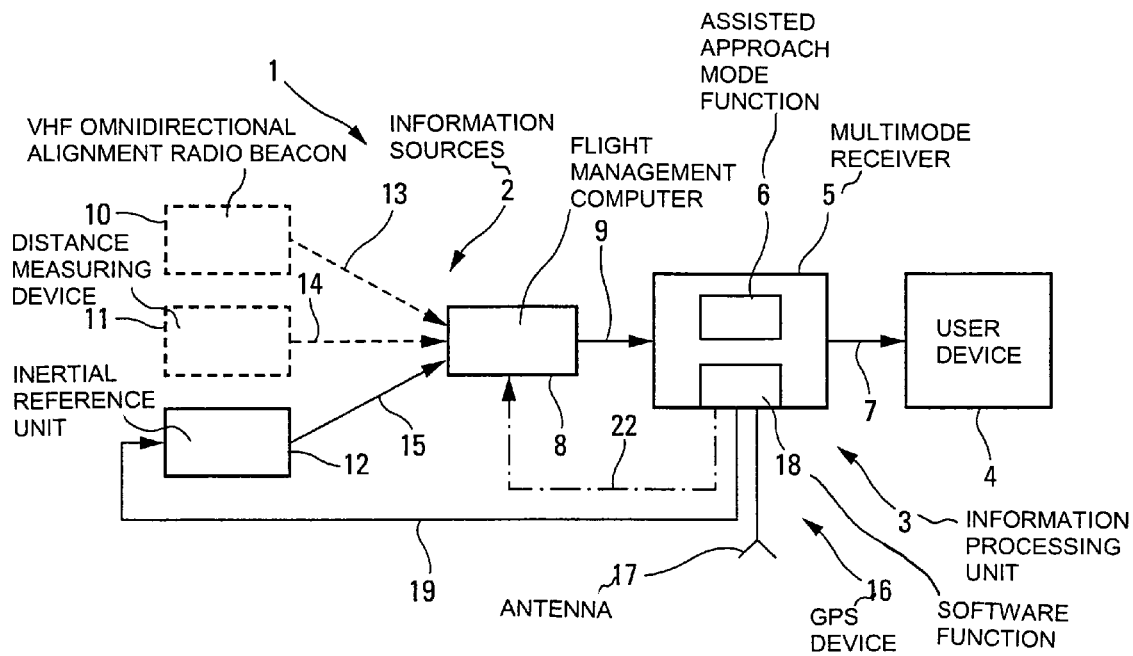
FIG. 2 illustrates a second embodiment of the invention for piloting an aircraft during a non-precision approach.

In another embodiment represented in FIG. 2, in a first variant, the inertial reference unit 12 is connected directly by a specific link 19 to the software function 18 of the GPS device 16. It receives a GPS position indication from this GPS device 16.

In this case, said inertial reference unit 12 determines, on the basis of its own position indication and of this GPS position indication, a refined position indication, thereby making it possible of course to increase the precision of the position indication which is then transmitted to the multimode receiver 5, via the computer 8 and the links 15 and 9.

Figure 3:
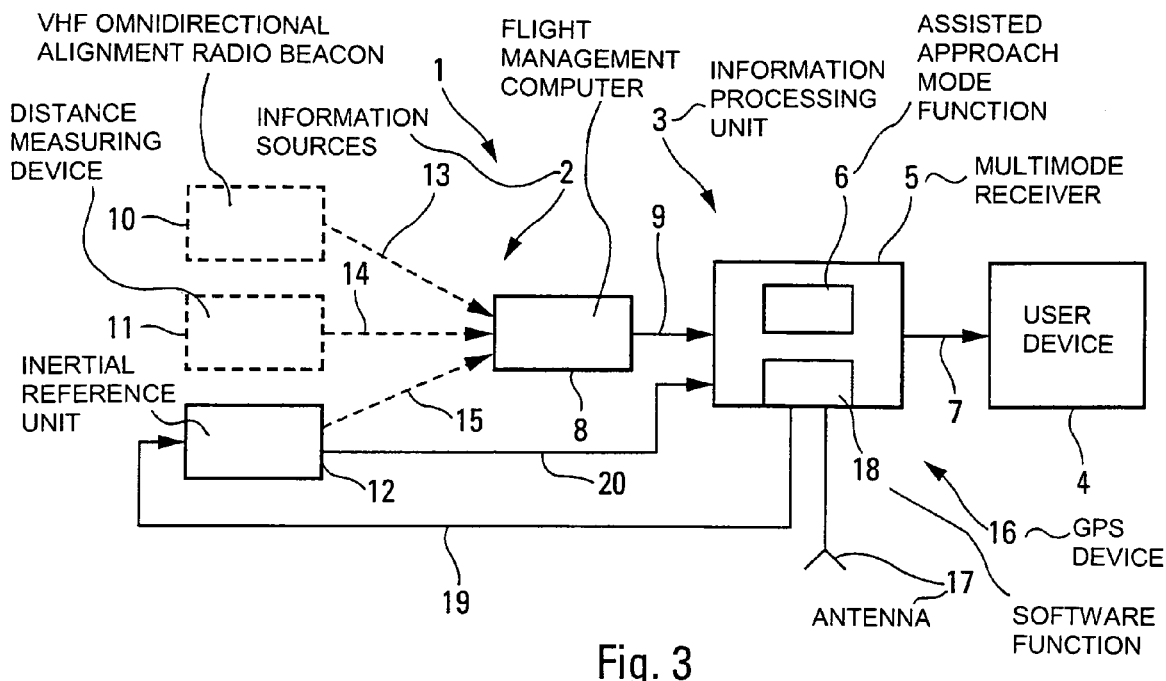
FIG. 3 illustrates a third embodiment of the invention for piloting an aircraft during a non-precision approach.
Figure 4:
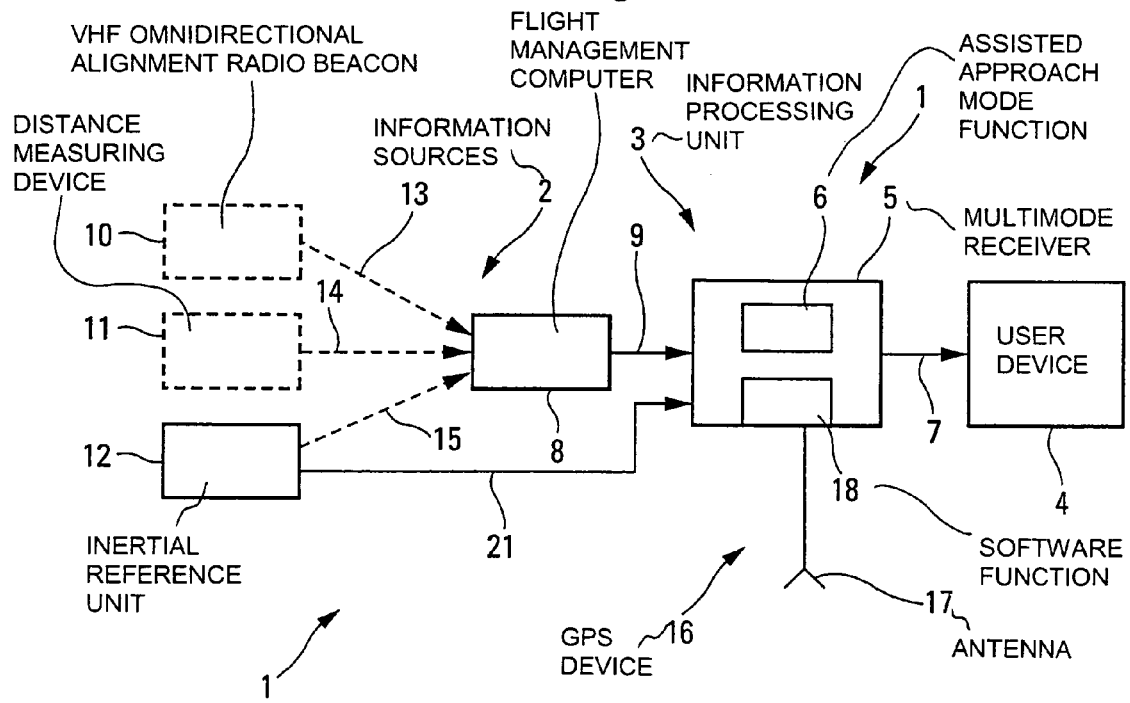
FIG. 4 illustrates a fourth embodiment of the invention for piloting an aircraft during a non-precision approach.

It will be noted that, in the embodiments of FIGS. 2 to 4, the sensors and the links of the piloting system 1 which do not participate in the determination and in the transmission of the position indication have been presented by dashed lines.

In a second variant of the embodiment of FIG. 2, the piloting system 1 comprises a link 22 (represented chain dotted) instead of the link 19. This link 22 connects the software function 18 of the GPS device 16 directly to the flight management computer 8. In this variant, said computer 8 receives a position indication (preferably comprising the altitude, the longitude and the latitude of the aircraft) which is computed by the inertial reference unit 12, directly from the latter via the link 15, and a GPS position indication, directly from said software function 18 via the link 22. Said computer 8 computes, on the basis of these two position indications, a refined position indication, which it transmits to the multimode receiver 5. The advantage of this second variant over the first variant of FIG. 2, resides in the fact that this variant does not require any modification of the software of the inertial reference unit 12.

The embodiment of FIG. 3 is akin to that of the first variant of FIG. 2, the only difference being that the inertial reference unit 12 transmits the refined position indication directly to the multimode receiver 5, with the aid of a specific link 20, that is to say without going via the computer 8.

This makes it possible to improve the level of integrity of the aircraft's position indication. Specifically, the computer 8 presents a level of integrity which is lower than the levels of integrity of the unit 12 and of the multimode receiver 5. As a result of this, the level of integrity of the information is better when the multimode receiver 5 receives it from the unit 12 than when it receives said information from the computer 8.

Another advantage of this embodiment resides in the fact that the delay between the moment at which data (GPS signals, information from the sensors of the inertial reference unit 12) making it possible to compute said position indications, are received aboard the aircraft, and the moment at which said position indications are received by the multimode receiver 5, is less than in said first variant of the embodiment of FIG. 2, since the operation of processing of said position indications by the computer 8 is eliminated.

This makes it possible to improve the performance of the guidance carried out (for example by the automatic pilot) on the basis of the information regarding departure (of the position of the aircraft from the virtual approach axis) that is formulated by the multimode receiver 5. For example, it is possible to estimate this delay at around 1 second (corresponding to a distance traveled by the aircraft, hence to a position error, of around 72 meters for an approach speed of 140 knots) in the example of the first variant of FIG. 2, and at only 150 milliseconds (i.e. a position error of around 11 meters) in the example of FIG. 3. However, the guidance laws integrated into the automatic pilot are optimized for the ILS mode, in which a delay due to the processing of the information is of the order of 100 milliseconds (i.e. a position error of around 7 meters). Said position error of around 11 meters being much like the position error of around 7 meters corresponding to the ILS mode, it is readily understood that the performance of the guidance will be better in the example of FIG. 3 than in the example of the first variant of FIG. 2 (position error of around 72 meters). However, it should be noted that, even in the example of the first variant of FIG. 2, the position error remains well below the precision required during the approach, which is of the order of 180 meters.

In another embodiment represented in FIG. 4, the inertial reference unit 12 is connected directly to the multimode receiver 5, by way of a specific link 21 which can correspond, for example, to the link 20 of FIG. 3.

In this last embodiment, the multimode receiver 5 determines a refined position indication of the aircraft, on the basis:

of a position indication which is provided by the software function 18 (GPS) which is integrated into said multimode receiver 5; and of a position indication which is determined by the inertial reference unit 12 (on the basis of data emanating from anemometric and/or inertial sensors) and which is transmitted by the link 21.

Additionally, it will be noted that:

in the first variant of the embodiment of FIG. 2 and in the embodiment of FIG. 3, the position indication that the inertial reference unit 12 receives from the GPS device 16 corresponds to raw data, that is to say to data of relative position of the aircraft with respect to various GPS satellites; and in the second variant of the embodiment of FIG. 2 and in the embodiment of FIG. 4, the position indication determined by the software function 18 corresponds; preferably, to a position of the aircraft in a terrestrial reference frame and characterized for example by its latitude, its longitude and its altitude.

The invention claimed is:

1. An aircraft piloting system, at least for piloting an aircraft during a non-precision approach with a view to a landing, said piloting system comprising:

information sources that provide at least one indication of position relating to the actual position of the aircraft;

a data base containing information for forming a virtual approach axis;

an information processing unit that processes information emanating from said information sources, wherein said information processing unit comprises a landing aid multimode receiver, which includes a satellite-based positioning function, that implements a precision approach providing horizontal and vertical guidance before and during landing by presenting the pilot with lateral deviation of the aircraft with respect to an approach axis and vertical deviation of the aircraft with respect to a descent plane, wherein said information processing unit moreover comprises an assisted approach mode function, which is integrated into said receiver and implements a non-precision approach, by determining the lateral and vertical deviations between the actual position of the aircraft and the position that the aircraft would have if the aircraft were on said virtual approach axis; and
a user device that uses the information provided by said landing aid multimode receiver to support the guidance of the aircraft up to its landing, so as to cancel the lateral and vertical deviations, wherein:
the same guidance laws are used both for the precision mode and the non-precision mode,
a plurality of assisted approach modes are possible for the non-precision approach,
the pilot may select one of the assisted approach modes, and
the virtual approach axis is representative of the assisted approach mode selected by the pilot.

2. The piloting system as claimed in claim 1, wherein said satellite-based positioning function is linked with a satellite-based positioning system.

3. The piloting system as claimed in claim 1, wherein said information sources comprise a flight management computer.

4. The piloting system as claimed in claim 3, wherein said information sources comprise a plurality of sensors which are connected to said flight management computer.

5. The piloting system as claimed in claim 1, wherein said information sources comprise, moreover, an inertial reference unit which determines a first position indication of the aircraft.

6. The piloting system as claimed in claim 5, wherein said inertial reference unit provides said first position indication to a flight management computer, which transmits this first position indication to said landing aid multimode receiver.

7. The piloting system as claimed in claim 5, wherein said inertial reference unit provides said first position indication directly to said landing aid multimode receiver, by way of a specific link.

8. The piloting system as claimed in claim 7, wherein said satellite-based positioning function is linked with a satellite-based positioning system, which determines a second position indication, and wherein said landing aid multimode receiver determines on the basis of said first and second position indications a first refined position indication.

9. The piloting system as claimed in claim 5, which comprises a satellite-based positioning device which determines a third position indication which it provides to said inertial reference unit, and wherein said inertial reference unit determines a second refined position indication on the basis of said first and third position indications.

10. The piloting system as claimed in claim 9, wherein said inertial reference unit provides said second refined position indication to a flight management computer, which transmits this second refined position indication to said landing aid multimode receiver.

11. The piloting system as claimed in claim 9, wherein said inertial reference unit provides said second refined position indication directly to said landing aid multimode receiver, by way of a specific link.

12. The piloting system as claimed in claim 5, wherein the satellite-based positioning function determines a fourth position indication which it provides to a flight management computer, wherein said inertial reference unit provides said first position indication likewise to said flight management computer, and wherein said flight management computer determines, on the basis of said first and fourth position indications, a third refined position indication, which it transmits to said landing aid multimode receiver.

13. An aircraft, which comprises the piloting system specified under claim 1.

14. The aircraft piloting system of claim 1, further comprising:
a flight management computer that transmits information regarding the threshold position of a landing strip and the angle of descent of the aircraft to the landing aid multimode receiver, wherein:
the landing aid multimode receiver uses the received threshold position information and angle of descent information to characterize a virtual approach axis that is representative of an assisted approach mode selected by the pilot.

15. An aircraft piloting system, at least for piloting an aircraft during a non-precision approach with a view to a landing, said piloting system comprising:
information sources that provide at least one indication of position relating to the actual position of the aircraft;
a data base containing information for forming a virtual approach axis;
an information processing unit that processes information emanating from said information sources, wherein said information processing unit comprises a landing aid multimode receiver, which includes a satellite-based positioning function, that implements a precision approach providing horizontal and vertical guidance before and during landing by presenting the pilot with lateral deviation of the aircraft with respect to an approach axis and vertical deviation of the aircraft with respect to a descent plane, wherein said information processing unit moreover comprises an assisted approach mode function, which is integrated into said receiver and implements a non-precision approach, by determining the lateral and vertical deviations between the actual position of the aircraft and the position that the aircraft would have if the aircraft were on said virtual approach axis; and
a user device that enables use of the information provided by said landing aid multimode receiver to support the guidance of the aircraft up to its landing, so as to cancel the lateral and vertical deviations, wherein:
the same guidance laws are used both for the precision mode and the non-precision mode,
a plurality of assisted approach modes are possible for the non-precision approach,
the pilot may select one of the assisted approach modes,
the virtual approach axis is representative of the assisted approach mode selected by the pilot,
said information sources comprise, moreover, an inertial reference unit which determines a first position indication of the aircraft,
said inertial reference unit provides said first position indication directly to said landing aid multimode receiver, by way of a specific link, and
said satellite-based positioning function is linked with a satellite-based positioning system, which determines a second position indication, and wherein said landing aid multimode receiver determines on the basis of said first and second position indications a first refined position indication.

* * * * *